United States Patent [19]

McColgan et al.

[11] 4,082,081
[45] Apr. 4, 1978

[54] PORTABLE LIGHT-WEIGHT SOLAR HEATER

[76] Inventors: John M. McColgan, 1623 Roscomare Rd., Los Angeles, Calif. 90024;
Philip F. O'Brien, 142 N. Carmelina Ave., Los Angeles, Calif. 90049

[21] Appl. No.: 641,740

[22] Filed: Dec. 18, 1975

[51] Int. Cl.$^2$ ............................................. F24J 3/02
[52] U.S. Cl. ............................................. 126/271; 4/172.12
[58] Field of Search ............... 126/270, 271; 237/1 A; 4/172.12

[56] References Cited

U.S. PATENT DOCUMENTS

| | | | |
|---|---|---|---|
| 2,366,184 | 2/1945 | Dean | 126/271 |
| 3,859,980 | 1/1975 | Crawford | 126/271 |
| 3,893,443 | 7/1975 | Smith | 126/271 |

FOREIGN PATENT DOCUMENTS

| | | | |
|---|---|---|---|
| 1,161,887 | 8/1969 | United Kingdom | 126/271 |
| 1,328,372 | 8/1973 | United Kingdom | 126/271 |

*Primary Examiner*—Kenneth W. Sprague

[57] ABSTRACT

A unique and extremely practical solar heater has been described which is particularly suited to the heating of swimming pools. The novelty of the system lies in the use of an extremely light-weight flexible unit of essentially all plastics construction which floats upon the surface of the pool and is easily removed therefrom, and which functions dually as a flat plate collector by virtue of water circulating through it during sunlight hours, and as an efficient insulator and vapor barrier for the pool surface. A number of such units are generally employed to cover most of the surface of a swimming pool, and are covered by a relatively thin plastic overcover, preferably transparent and tinted an attractive color.

6 Claims, 3 Drawing Figures

PORTABLE LIGHT-WEIGHT SOLAR HEATER

BACKGROUND OF THE INVENTION

This invention relates to solar water heating systems specifically designed for swimming pools and the like, and provides a novel concept of design featuring light weight and easy removability from the surface of a pool, which tremendously reduces the problems of cost, space and aesthetics which have been serious detriments to more widespread use of solar heaters for swimming pools.

Rigid flat plate solar collectors of innumerable designs of varying degrees of sophistication to achieve varying degrees of efficiency are well known. However all such solar energy collectors to date have been used very little for domestic swimming pool heating largely due to their problems of relatively high cost, and the site cost and problems involved in finding a suitable space in which to locate them without aesthetically degrading the area.

Similarly, pool covers of varying degrees of ability to reduce heat loss, to keep the pool relatively clean, and to provide some protection against small children falling into the pool are well known.

In the present invention the functions of a flat plate solar collector and an insulating pool cover are combined in a novel, flexible, light weight, essentially all plastic construction.

SUMMARY OF THE INVENTION

The present invention consists of a relatively thin flexible cellular plastic insulating sheet floating upon the surface of a swimming pool and having secured to its upper surface a plurality of flexible plastic lay-flat tubes, preferably black, through which the water from the swimming pool circulation system is passed during sunlight hours. A sufficient number of such sheet and plastic tube assemblies are positioned adjacent each other on the pool surface to cover it completely or as nearly so as practical. An over-cover of relatively thin plastic material, preferably transparent and tinted as aesthetically attractive color, is superimposed over the cellular plastic sheet and plastic tube assemblies floating upon the pool surface. The support provided by the floating cellular plastic sheets permits this over-cover to be contoured neatly to fit snugly within the confines of the edges of the pool, without concern regards water seeping onto it from the edges and sinking it.

DESCRIPTION OF THE PREFERRED EMBODIMENT OF THE INVENTION

Figure 1:
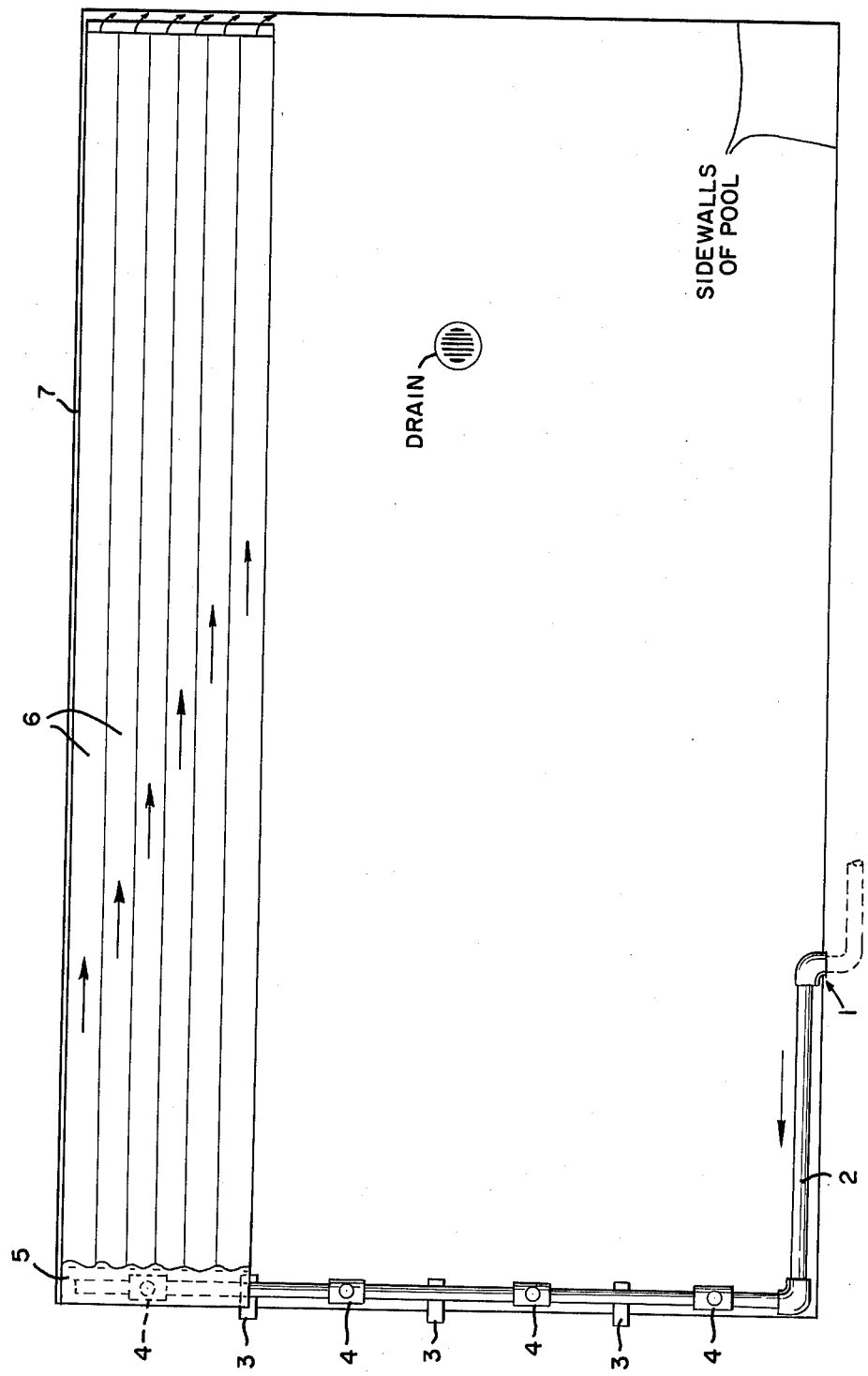

The invention will be more clearly understood by reference to the accompanying drawings in which:

FIG. 1 presents a general plan view of a swimming pool on which the invention is installed.

Figure 2:
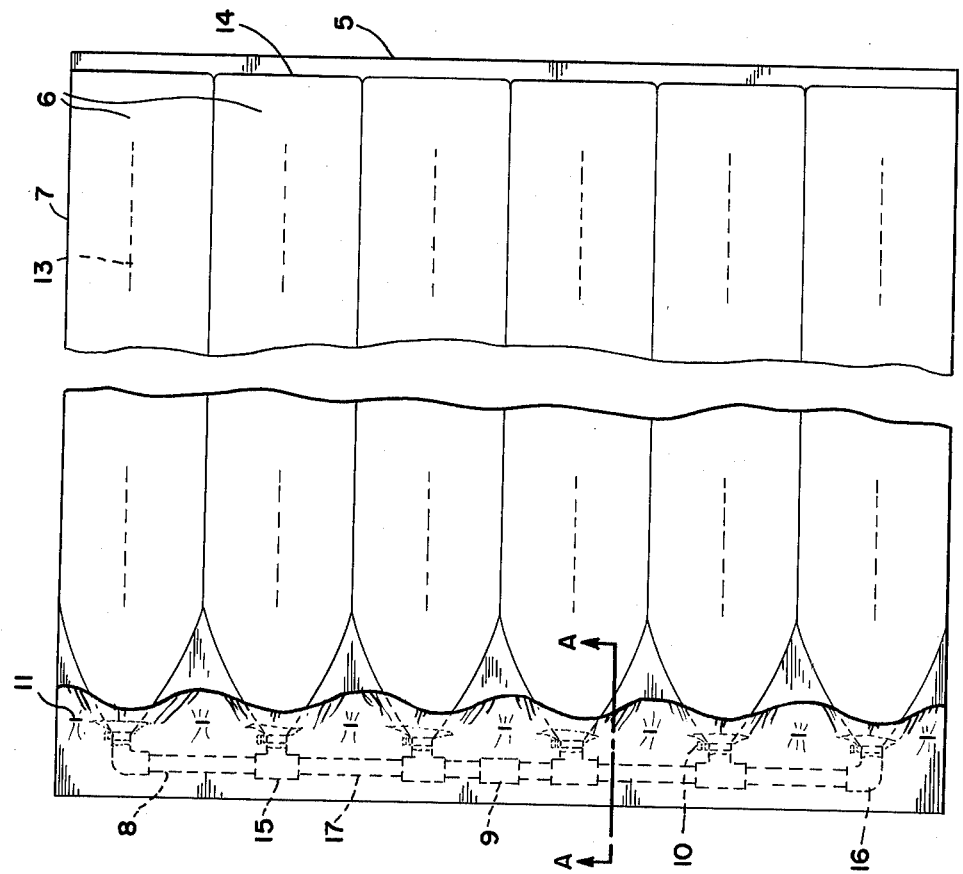

FIG. 2 presents in more detail the construction of the floating plastic sheet and flexible plastic tube assembly 7, which was shown only generally in FIG. 1.

Figure 3:
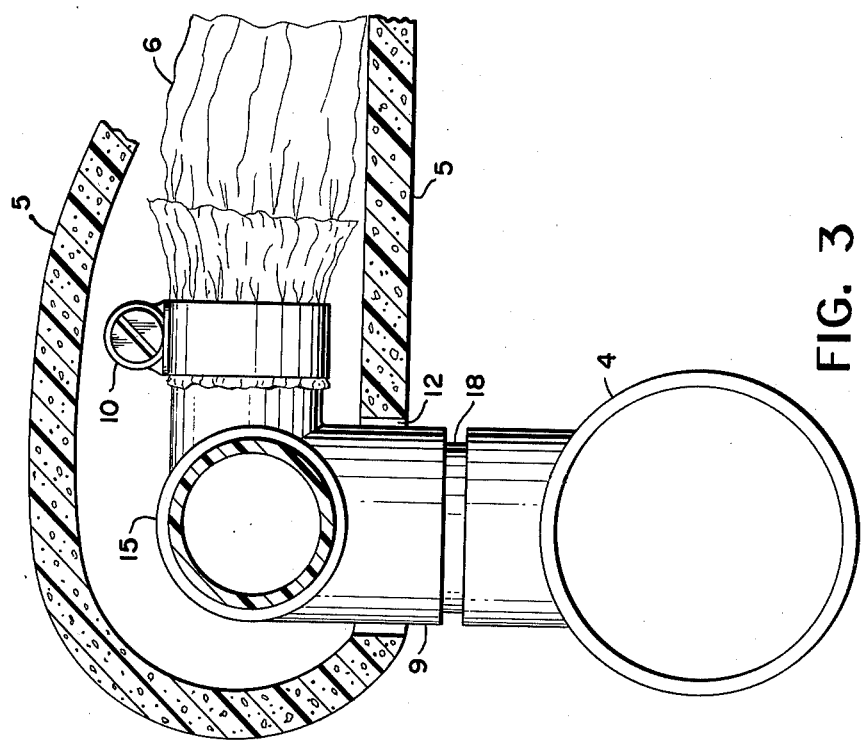

FIG. 3 presents the sectional view A—A from FIG. 2 showing the detail of the connection from the primary manifold 2 to the second manifold 8, and the manner in which the flexible plastic tubes 6 are fastened to the plastic fittings on the secondary manifold.

Referring them to FIG. 1, for the sake of simplification only a single floating flexible cellular plastic sheet and plastic tube assembly 7 is illustrated. A total of four such assemblies would normally be positioned on the surface of a pool of the size illustrated, each being connected to the primary manifold 2, at one of the reducing tee fittings 4. The primary manifold is supported by suitable plastic hangers 3.

The primary manifold is constructed from readily available PVC or ABS plastic pipe and fittings, and serves to deliver the water being pumped back to the pool by the pool water filtering and circulating system, from the return inlet 1, to each of the floating cellular plastic sheet and tube assemblies 7. The arrows on FIG. 1 indicate water flow direction. In each of these assemblies, the water flows through the flexible plastic tubes 6 and out the open ends thereof to return to the pool. The plastic tubes 6 are preferably black for optimum absorption of solar energy. While it is not illustrated, a thin plastic sheet over-cover, preferably transparent and tinted and attractive color, is superimposed over all the floating sheet and tube assemblies on the pool to improve the aesthetic appearance of the pool, provide the heating benefits of the "greenhouse" effect, and to minimize evaporation. The presence of this over-cover also eliminates any concern regards loss of efficiency due to water seepage, splashage, leakage etc., onto the surface of the plastic tubes 6.

With reference next particularly to FIGS. 2 and 3, details of the construction of one of the floating flexible cellular plastic sheet and plastic tube assemblies will be presented in terms of materials which are currently readily available and most economical and practical to use. Obviously when deemed practical, other suitable flexible cellular plastic sheet materials and other plastic tube and over-cover materials may well be used.

The currently preferred cellular plastic sheet material 5 is flexible cellular polyethylene sheeting approximately 0.25 inches in thickness. This material is available in rolls approximately 4 ft. wide to a length of 120 ft., under the trade name Ethafoam 220 from the Dow Chemical Co. Midland, Mich. The thermal conductivity of this material is approximately 0.30 BTU/sq. Ft./ inch/ degree F/hr. and is an excellent insulator. This material weighs approximately 2.2 lbs./cu. ft. and since it is a closed cell foam, it serves effectively as a float also to maintain the tubes 6 attached to it at the surface of the pool.

The tubes 6 consist of conventional blown polyethylene lay-flat tubing 10 inches wide with a wall thickness of approximately 0.006-0.008 inches. For maximum durability and solar energy absorption they are preferably made from a black polyethylene compound containing approximately 2% carbon black such as is commonly used for agricultural sheeting.

With reference to FIGS. 2 and 3, it can be seen that at one end of the assembly 7, there is secured a secondary manifold 8, which is comprised of a plastic pipe tee 9, four plastic pipe reducing tees 15, and two plastic pipe reducing ells 16, all interconnected with suitable short lengths of plastic pipe 17. The side opening of the tee 9 extends downwardly through the hole 12 cut in the cellular plastic sheet 5 to connect via the short piece of plastic pipe 18 to the upwardly extending reduced side opening of one of the primary manifold fittings 4.

To each of the horizontally disposed side openings of the reducing tees 15 and the reducing ells 16 is secured one end of one of the lay-flat tubes 6 in the manner shown in detail in FIG. 3. As is illustrated one end of a lay-flat tube 6 is doubled back on itself to provide a double thickness, is puckered and gathered together to enable it to be pulled through the hose clamp 10, and after being slipped over the the side opening of the fitting, is secured by tightening the clamp. The hole 12 is positioned centrally in from the end of the cellular plastic sheet sufficiently, usually about 6 inches, so that this end portion of the cellular plastic sheet may be folded over the top of the secondary manifold 8 and secured by seven suitable plastic quick-ties 11 to the bottom of the same cellular plastic sheet 5 as indicated in FIG. 2, thereby covering and securing in position the secondary manifold 8. It should be noted that since the quick-ties 11 function by piercing through both the folded over and bottom portion of the cellular sheet 5, they are located in between and clear of the edges of the tubes 6.

A series of intermittent heat seals 13, each approximately 12 inches or more in length, serve to secure each of the plastic lay-flat tubes to the cellular plastic sheet 5. There is no need that these seals be continuous. There function is to provide a convenient means for adequately securing the tubes 6 to the cellular plastic sheet 5.

The ends of the tubes 6, opposite from the manifolds, are open as illustrated at 14. However in some cases where it is considered advantageous to return the sunlight heated water passing through the tubes 6 to some depth below the pool surface, to promote mixing etc., or to raise the temperature in some spa area of the pool, the tubes need not be cut off as illustrated but rather may be extended and allowed to extend over the edge of the cellular plastic sheet 5, to the desired depth or to the desired area.

In addition to the above description, particular attention is directed to the following:

All of the plastic pipe and fitting joints in the primary and secondary manifolds are cemented in the normal manner, with the special exception of the joint between the downwardly extending side opening of the tee 9 and the short length of plastic pipe 18. By this arrangement the snug fit of the fitting to the pipe is adequate to maintain the connection between the primary and secondary manifolds when in normal use, and they may be quickly disconnected when desired to uncover the pool.

The centerlines of adjacent openings in the secondary manifold 8 are approximately 8 inches apart, in this instance where a cellular plastic sheet approximately 48 inches wide is being employed. Each plastic tube 6 is heat sealed on its centerline in line with the manifold opening to which it is attached. When empty the 10 inch lay-flat tubes will overlap; however this overlap is preferable so that the plastic tubes fully cover the cellular plastic sheet when water is flowing through them, sometimes to a depth of approximately one inch.

For a typical pool in the 16 × 32 foot or 20 × 40 foot size range, with a circulating system pumping in the range of 30 to 50 gallons per minute, a primary manifold size of 1¼ inch, reducing to ¾ inch entries into the secondary manifolds has been found satisfactory. The secondary manifolds are ¾ inch with ½ inch exits into the flexible plastic tubes 6. For special situations and other sizes of pools, standard plumbing practices will dictate the appropriate size of piping.

What has been described heretofor, when in position on a pool with water circulating through it during sunlight hours, can by itself function as a unique flexible, easily removeable, all plastic flat plate solar energy collector weighing approximately only 3 ounces per sq. ft. However, its overall effectiveness and practicality is greatly enhanced when used in combination with a thin polyethylene (usually 0.004–0.006 inch thickness) plastic sheet over-cover, preferably transparent and tinted an aesthetically attractive color. This over-cover is beneficial in many ways such as improving the aesthetic appearance of the pool, minimizing evaporation and loss of chemicals, providing the benefits of the "greenhouse" effect, and helping keep the pool clean.

In use, the above described equipment is employed in the following manner:

When the pool is not being used for swimming, it is normally covered by the assemblies 7, over all of which is superimposed the transparent over-cover. Where the heating of the pool water is provided by solar energy alone, the timer on the pool circulation pump is set to provide circulation only during the hours of sunlight on the pool. Whenever it is desired to use the pool for swimming, it is a very simple matter to fold back the over-cover as far as is necessary and remove one or more of the assemblies 7 as desired. This is simply done in each instance by pulling up on underside of the fitting 9, separating it from the pipe stub 18, and pulling the long edge of the assembly 7 progressively over the edge of the pool, where the assembly 7 can be left to lie on the deck temporarily for the duration of a short swim until it is replaced. Alternately, starting with the secondary manifold end of the assembly 7, the latter may be rolled up into a compact roll and stored until needed.

Where it is desired to augment solar heating with the use of either a thermostatically controlled gas fired or electric water heater, and the heater is to be operated and pool water circulated after sunlight hours, then the primary manifold should be disconnected manually from the return inlet 1 during such periods of operation.

If it is desired to automate the operation, then it is only necessary to install at the return inlet 1, a conventional bypass valve actuated by a conventional photoelectric cell and relay device designed to open in the absence of sunlight to direct the water returning to the pool to the area under the assemblies 7 rather than through the tubes 6 as would be normal the hours of sunlight on the pool. In some cases it may be desired to augment this type of automatic operation by using the same or another conventional photoelectric cell and relay device to prevent the gas fired or electric water heater from coming on during the hours of sunlight on the pool.

Although a specific embodiment of the present invention has been described and illustrated, it is to be understood that the same is by way of illustration and example only, and that the invention is not limited thereto, as variations may be readily apparent to those versed in the art, and the invention is to be given its broadest possible interpretation.

We claim:

1. A flat plate solar energy collector assembly adapted to float on the water surface of a pool, comprising a relatively thin flexible cellular plastic sheet floating upon and insulating the surface of the pool, a plurality of parallel flexible thin plastic tubes extending over substantially the entire area of the floating plastic sheet, means securing said tubes to the top surface of the floating sheet, entry means provided at one end of said tubes, exit means provided at the other end of said tubes, said exit means from said tubes being relatively large in comparison to the entry means for said tubes and means for pumping the pool water into said entry means and through said thin flexible plastic tubes during hours of exposure to sunlight.

2. The flat plate solar energy collector assembly of claim 1, comprising a thin flexible plastic cover means disposed over said collector assembly.

3. The flat plate energy collector assembly of claim 1, comprising a thin relatively transparent flexible plastic cover means disposed over said collector assembly.

4. The flat plate solar energy collector assembly of claim 1, wherein a secondary manifold, means connecting said secondary manifold to the entry means of said tubes, means securing said secondary manifold to the floating cellular plastic sheet, a primary manifold and quick-disconnect fitting means interconnecting said secondary manifold and said primary manifold to facilitate quick and easy removal of the solar energy collector assembly from the pool.

5. The flat plate solar energy collector assembly of claim 4, comprising a thin relatively transparent flexible plastic cover means disposed over said collector assembly.

6. The flat plate solar energy collector assembly of claim 1, wherein said exit means discharge directly into said pool.

* * * * *